Patented Apr. 3, 1951

2,547,766

UNITED STATES PATENT OFFICE 2,547,766

VAPOR PHASE HYDRATION

James H. McAteer, Cranford, N. J., assignor to Standard Oil Development Company, a corporation of Delaware No Drawing. Application May 10, 1946, Serial No. 668,782

5 Claims. (Cl. 260—635)

This invention relates to catalytic vapor phase hydration of olefin oxides and similar compounds, as represented by hydration of propylene oxide to produce propylene glycol.

Previous work has shown that a dilute solution of propylene oxide in water is converted into an aqueous propylene glycol solution at room temperature. The hydration reaction under these conditons is slow, but the use of higher temperatures to accelerate the reaction leads to formation of glycol ethers in substantial amounts, which may correspond to 14% of the original oxide when a 2N oxide solution is reacted at 100° C.

The hydration reaction may be catalyzed by acids, such as sulfuric acid. For instance, 0.1 to 0.5 weight per cent of sulfuric acid in a 2N solution of propylene oxide at 30° C. produces about 1 to 10% of glycol ether by-product. The catalyzed liquid phase hydration process of this type has the disadvantage associated with the necessity of removing the acidic catalyst from the aqueous solution during the product workup to obtain pure glycol. Moreover, in such hydration processes rather dilute concentrations of the reactant are used in order to minimize formation of glycol ethers. In consequence of this, removal of large amounts of water by evaporation is required during the subsequent recovery of the product. The same is true in the hydration of ethylene oxide and higher alkylene oxides.

Although considerable work has been done on liquid phase hydrolysis of olefin oxides, no work of any importance relative to vapor phase hydration is found. Vapor phase reactions with various catalysts have been described as effecting isomerization to carbonyl isomers and alcohols.

An object of this invention is to provide a method for obtaining a selective vapor phase hydration of an organic compound which has strong tendencies to polymerize and isomerize at elevated temperatures.

A more specific object is to provide a process for preparing a glycol by a catalytic vapor phase hydration of an olefin oxide.

The process is described more particularly with reference to hydration of an olefin oxide, but it may be extended to other organic compounds capable of hydration or hydrolysis for reduction or elimination of objectionable side reactions.

For the process, catalysts giving the best results are high boiling and high melting polyvalent metal fluorides, such as aluminum fluoride. The preferred catalyst is a fluoride which in a substantial part has a gel structure. The catalyst may contain the fluorides in complexes and partly hydrated.

Selective hydration of an olefin oxide or similar type of hydrolyzable organic compound is carried out by passing the compound in vapor phase at temperatures within the range 150° C. to 350° C. in contact with the fluoride catalyst and in the presence of steam.

In one application of this process a mixture of propylene oxide and water vapor (1:7 mol ratio; equivalent to a 5N solution of the oxide at 30° C.) was passed at one atmosphere total pressure over pellets of aluminum fluoride, having a gel structure and activated by heating to 1000° F., in a jacketed reactor (257° C.). The space velocity of the oxide was maintained at 870 v. (S. T. P.)/v./hr. and catalyst temperatures, as measured by a thermocouple within a well arranged co-axially with the catalyst bed, varied from 256° to 272° C. at different depths. The space velocity is in terms of reactant vapor volume at standard temperature and pressure (S. T. P.) passed through unit volume of the catalyst bed per hour. The reaction products were condensed and fractionated; they contained a 90% yield of propylene glycol based on the propylene oxide feed.

In the operation, the catalyst showed a small increase in weight attributable to adsorbed products. Only slight amounts of isomerization products such as carbonyl compounds and mono-hydric alcohols were formed.

It was found that in the process the reaction products could be fractionated immediately upon discharge from the reaction zone. Any unreacted olefin oxide or volatile reactant was separated as vapor from the condensed product and could be recycled so as to avoid after-reaction in the liquid phase, which may tend to occur in treating a compound that energetically reacts in liquid phase with its hydration product to form undesired higher molecular weight condensation or polymer products. It is to be noted that one of the difficulties of hydrating the olefin oxide in liquid phase is that the glycol hydration products tend to react with the olefin oxides to form the higher molecular weight di- and poly-glycol ethers.

This vapor phase process with the type of catalyst described is adapted for use with various catalyst techniques, such as fluid catalyst technique or others in which the catalyst is in motion or is stationary in a fixed bed. Advantages in the vapor phase oxidation with the catalyst that selectively promotes hydration with avoidance of isomerization are: high conversion and yield of the hydration product desired in a short contact time and avoidance of reaction between the hydration product with the compound being hydrated.

The present process is particularly suited for the hydration or the hydrolysis of oxides, anhydrides, ethers, and certain unsaturated organic compounds that react with water but which may, during the course of reaction in liquid media, tend to produce significant amounts of undesired by-products. Representative examples of these compounds are ethylene oxide, trimethylene oxide, monovinyl ethylene oxide, dioxane, dioxolane, and diallyl ether.

The vapor phase oxidation with the fluoride catalyst is not restricted to the use of the temperatures, pressure, space velocity, and steam dilution values employed in the example. These quantities may be varied over a range of values to give partial or complete conversion per pass.

I claim:

1. A process for the production of a hydration product of an organic compound selected from the group consisting of olefins, olefin oxides, and ethers which comprises, contacting vapors of the organic compound and water vapor in a reaction zone free of liquid in the presence of a solid metallic fluoride catalyst and recovering the hydration product.

2. A process for the production of a hydration product of an organic compound selected from the group consisting of olefins, olefin oxides, and ethers which comprises, contacting vapors of the organic compound and water vapor in a reaction zone free of liquid in the presence of a solid metallic fluoride catalyst having a gel structure and recovering the hydration product.

3. A process for the vapor phase hydration of an olefin oxide which comprises reacting an olefin oxide and water vapor at a temperature in the range of 150°–350° C. and at about atmospheric pressure in the presence of a solid metallic fluoride catalyst having a gel structure for a relatively short contact time, by which the alkylene oxide is hydrated free of liquid phase in a reaction zone, withdrawing the resulting reaction mixture product in vapor phase, and separating the hydration product.

4. A process according to that of claim 3 in which the solid metallic fluoride is essentially aluminum fluoride.

5. A process for the production of propylene glycol which comprises contacting a mixture of propylene oxide and water vapor at a temperature in the range of 150°–350° C. and at about atmospheric pressure with a solid catalyst consisting essentially of aluminum fluoride having a gel structure for a relatively short contact time, in which the propylene oxide is hydrated free of liquid to propylene glycol maintained in vapor phase, and thereafter separating the propylene glycol product from unreacted propylene oxide maintained in vapor phase.

JAMES H. McATEER.

REFERENCES CITED

The following references are of record in the file of this patent:

UNITED STATES PATENTS

| Number | Name | Date |
|---|---|---|
| 2,107,515 | Bent | Feb. 8, 1938 |
| 2,130,669 | Lewis | Sept. 20, 1938 |
| 2,135,271 | Balcar | Nov. 1, 1938 |
| 2,135,455 | Loder | Nov. 1, 1938 |
| 2,236,919 | Reynhart | Apr. 1, 1941 |
| 2,457,882 | Frey | Jan. 4, 1949 |

FOREIGN PATENTS

| Number | Country | Date |
|---|---|---|
| 486,783 | Germany | July 7, 1938 |
| 786,081 | France | Aug. 26, 1935 |